E. A. BOURQUIN.
Roller for Corn-Husking Machines.
No. 228,305.          Patented June 1, 1880.
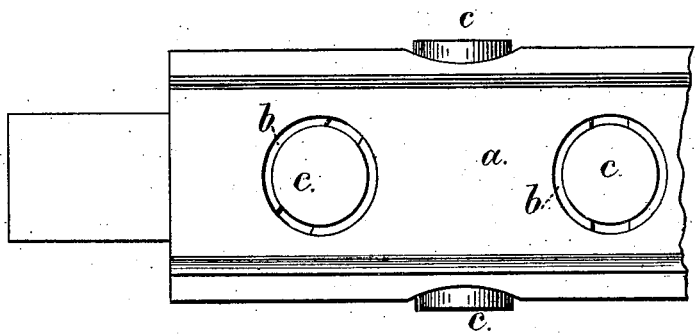
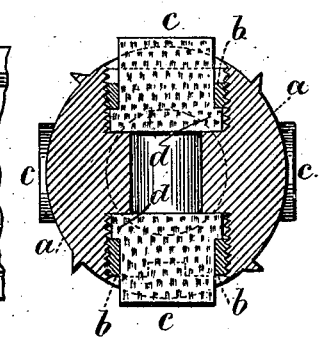
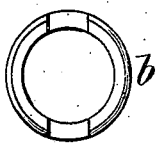
Witnesses
Chas H. Smith
Harold Serrell
Inventor.
Eugene A. Bourquin.
per Lemuel W. Serrell
atty.

UNITED STATES PATENT OFFICE.

EUGENE A. BOURQUIN, OF NEW YORK, N. Y.

ROLLER FOR CORN-HUSKING MACHINES.

SPECIFICATION forming part of Letters Patent No. 228,305, dated June 1, 1880.

Application filed December 22, 1879.

*To all whom it may concern:*

Be it known that I, EUGENE A. BOURQUIN, of the city and State of New York, have invented an Improvement in Rollers for Corn-Husking Machines, of which the following is a specification.

Corn-husking rollers have been made in which the surface has been covered with india-rubber, and in some instances india-rubber plugs have been introduced into the metal rollers.

My present invention relates to a means for securing the plugs of india-rubber or equivalent material into the holes.

In the drawings, Figure 1 is an elevation of part of a rubber roller. Fig. 2 is the plug of rubber separately, and Fig. 3 is a cross-section of the roller. Figs. 4 and 5 show the screw-thimble.

The roller $a$ is of metal. It usually stands at an inclination in the corn-husking machine, and is one of a pair of rollers that run together.

The roller $a$ is perforated so as to form cylindrical recesses, that are threaded for receiving the screw-thimble $b$. Such thimble will preferably be made of brass, so as not to become rusted into the cylinder.

The plug $c$, of india-rubber, is provided with a flange or head, $d$, at its lower end, and the plug drops easily into one of the holes in the cylinder, and then the thimble $b$ is screwed down around it and confines the flange $d$, so that the plug cannot become detached. The india-rubber stands up above the surface of the cylinder sufficiently to catch the corn-husk and pull the same in between the husking-rollers as the ear of corn slides down the pair of inclined rollers.

Leather, rawhide, gutta-percha, or equivalent material may be used in place of india-rubber, and I remark that the holes which receive the plugs and thimbles are preferably continued of a reduced size, as shown, so as to form a guide to the tool that cuts the screw-thread.

In place of screw-thimbles, the headed blocks of rubber or similar material may be held by a ring or plate screwed to the surface of the roller.

This roller may be available for other purposes than corn-husking.

I claim as my invention—

1. The combination, with the corn-husking rollers, of removable india-rubber plugs introduced into threaded recesses in the rollers and screw-thimbles for securing the same, substantially as set forth.

2. The plug, of india-rubber or similar material, having a head, in combination with the roller and the metal thimble or plate for securing the same to the roller, substantially as set forth.

Signed by me this 16th day of December, A. D. 1879.

EUGENE A. BOURQUIN.

Witnesses:
 GEO. T. PINCKNEY,
 WILLIAM G. MOTT.